(12) United States Patent  (10) Patent No.: US 8,717,546 B2
De Coi et al.  (45) Date of Patent: May 6, 2014

(54) ENERGY-SAVING 3-D SENSOR

(75) Inventors: Beat De Coi, Sargans (CH); Tobias Leutenegger, Chur (CH)

(73) Assignee: Cedes AG, Landquart (CH)

( * ) Notice: Subject to any disclaimer, the term of this patent is extended or adjusted under 35 U.S.C. 154(b) by 149 days.

(21) Appl. No.: 13/295,573

(22) Filed: Nov. 14, 2011

(65) Prior Publication Data

US 2012/0119062 A1    May 17, 2012

(30) Foreign Application Priority Data

Nov. 15, 2010   (EP) .................................... 10014619

(51) Int. Cl.
    *G01C 3/08* (2006.01)
(52) U.S. Cl.
    USPC ........................................................ 356/4.01
(58) Field of Classification Search
    USPC ...................................... 250/205; 356/3–5.15
    See application file for complete search history.

(56) References Cited

U.S. PATENT DOCUMENTS

| 2002/0172514 A1 | 11/2002 | Gabello et al. |
| 2004/0135990 A1 | 7/2004 | Ohtomo et al. |
| 2006/0044546 A1* | 3/2006 | Lewin et al. ................ 356/4.04 |
| 2008/0259281 A1* | 10/2008 | Odake et al. ...................... 353/7 |
| 2008/0285842 A1 | 11/2008 | Plasberg et al. |
| 2010/0020209 A1 | 1/2010 | Kim |

FOREIGN PATENT DOCUMENTS

| EP | 1 933 167 A2 | 6/2008 |
| EP | 2 148 514 A1 | 1/2010 |

OTHER PUBLICATIONS

European Search Report (Application No. 13004164.3) dated Nov. 4, 2013.

\* cited by examiner

*Primary Examiner* — Thanh Luu
*Assistant Examiner* — Renee Naphas
(74) *Attorney, Agent, or Firm* — Burr & Brown, PLLC

(57) ABSTRACT

A 3-D sensor for controlling a control process comprising a light source that includes at least one illumination source, a reception matrix for receiving a complete image of light reflected from areas from a spatial section, an evaluation device for determining the distance between the areas and the reception matrix, and a supervisory device for recognizing an object, in which the light source illuminates a partial region of the spatial section which has at least one interspace.

12 Claims, 5 Drawing Sheets

ENERGY-SAVING 3-D SENSOR

FIELD OF THE INVENTION

The present invention relates to a 3-D sensor for detecting objects in an area and for transmitting detection signals in a control process.

BACKGROUND OF THE INVENTION

In order to increase the operating safety of doors and/or gates that are to be opened automatically, the use of commercially available 3-D monitoring sensors is known. The latter signal a potential hazard situation when an object is detected in a hazard region situated as a result of the movement of the door to be opened and/or of the gate to be opened. By way of example, for this purpose they can communicate a corresponding signal to the relevant door and/or gate controller.

SUMMARY OF THE INVENTION

The invention addresses the problem of improving a sensor in accordance with the prior art mentioned in the introduction.

Accordingly, the present invention relates to a 3-D sensor for controlling a control process comprising a light source comprising at least one illumination source, a reception matrix, which is suitable for receiving a complete image of light reflected from areas from a spatial section, an evaluation device for determining the distance between the areas and the reception matrix, and a supervisory device for recognizing an object. This 3-D sensor is distinguished by the fact that the light source illuminates a partial region of the spatial section which has at least one interspace.

In this case, the spatial section can be defined, in particular, by that part of a space which extends between the reception matrix and the area to be imaged thereon. By way of example, the reception matrix in the 3-D sensor is fixed to a top side of a door and the area to be imaged is a rectangular area on the ground/floor in front of the door. This imaging can, in particular, preferably involve a bijective mapping.

The depth of the spatial section between the reception matrix and the area to be imaged thereon can be different for different pixels of the reception matrix. This can result firstly from the fan-out of the relevant spatial rays in accordance with the size of the field that can be detected by the matrix and the distance respectively associated therewith in discrete fashion. A second cause can stem from unevenesses in the article plane to be detected by the reception matrix, such as can arise for example as a result of objects situated therein and/or penetrating therein.

As a result, it is possible to ascertain correspondingly stepped distances between the reception matrix and the surface that reflects the light respectively emitted by the light source, such as ground/floor, wall, or simply an object. The distances can be determined for example by means of a propagation time determination for the light reflected from the relevant surface to the respective pixel of the reception matrix. This can be done in a particularly preferred manner with the aid of the evaluation device, to which the signals of the individual pixels of the reception matrix can be applied. On the basis thereof, the supervisory device can check whether an object is situated in the spatial section to be monitored.

If such an object is recognized, a graded hazard signalling such as e.g. low, medium, high, can subsequently be effected on the basis of a definable hazard distance between a potential hazard source, such as e.g. a door to be moved and/or a gate to be moved, or the like, and the recognized object.

In one embodiment of the invention of the 3-D sensor, the light source only illuminates a partial region of the spatial section which has at least one interspace which in particular is not illuminated or at least not illuminated by the light source to the extent as provided for the partial region of the spatial section. This is based on the insight that by concentrating the light intensity emitted by the light source on such a partial region, it is possible to achieve a decisive increase in the light radiation reflected from the surface of the partial region onto the reception matrix. This in turn brings about a significantly improved signal recognition, since the level of a threshold value for the signal evaluation can be correspondingly raised in order to mask out noise signals.

Therefore, a greatly improved switching sensitivity and switching accuracy can be achieved overall for the partial regions of the spatial section to be monitored which are evaluated by the 3-D sensor, given the same emission power, in comparison with a spatial section illuminated over the whole area. Further, the range of the sensor can be correspondingly increased by the concentration of the emission power.

With regard to a second aspect, by means of the 3-D sensor constructed in this way, it is possible to obtain a significant energy saving in comparison to a 3-D sensor which, with comparatively the same switching sensitivity, would illuminate the same spatial section over the whole area. In this context, the 3-D sensor according to the invention also brings about a significant reduction of the waste heat generated by the light source, which in turn also makes it possible to reduce or, if appropriate, even completely obviate cooling means. In addition, this reduction of power loss and waste heat not generated also has a positive effect on the service life of the 3-D sensor and the components thereof, in particular the temperature-sensitive components thereof.

In order that the spatial section to be monitored can be monitored for the presence and/or penetration of an object as much as possible in the complete outer boundaries of the spatial section, provision is made for dividing the partial region illuminated by the light source by defining at least one interspace which is not explicitly illuminated by the light source.

The resultant illuminated and non-illuminated regions of the spatial section to be monitored can constitute a wide variety of geometrical area regions having a wide variety of geometrical contours relative to the illuminated basic area.

The division of the partial region into a plurality of sub-partial regions separated by an interspace can enable for example uniform signal detection over the basic area of the section to be monitored. By way of example, illumination islands can thereby be distributed over the basic area. However, it is also possible to concentrate a plurality of sub-partial regions on specific regions of the basic area of the spatial section to be monitored, e.g. in particular the edge region thereof. Therefore, the sensor can be specifically configured in particular with regard to the monitoring of penetration of an object into the spatial region to be monitored by means of the local increase in the light intensity that is thus performed, for example, in a corresponding selectable operating mode.

Further geometrical figures relative to the basic area of the spatial section to be monitored can be effected by a corresponding stipulation for the arrangement of the partial region, in particular by the arrangement of such sub-partial regions into symmetrical and/or asymmetrical regions, such as e.g. an L-shape, a U-shape, a D-shape, a circumferential rectangle shape, a row and/or column arrangement, a meandering illumination contour, a jagged pattern, such as e.g. zigzag, line, rectangular geometries and suchlike, wherein these regions can also be provided multiple times and/or mixed with other patterns. Particularly preferably, provision is made for discretely illuminating individual regions of the entire spatial section to be monitored, for example in the form of discrete illumination spots.

In one preferred embodiment of the 3-D sensor, the light source can illuminate the sub-partial regions simultaneously. As a result, the entire partial region of the spatial region to be monitored can be correspondingly assessed at a specific point in time. In another embodiment for comparison therewith, however, a temporally offset illumination of at least individual sub-partial regions of the spatial section to be monitored can also be provided. By way of example, during a time in which no object is detected in the spatial section to be monitored, focusing on the edge monitoring can be effected and sub-partial regions lying within this edge region are not illuminated during this time. A further energy-saving possibility can be realized as a result. Upon detection of an object, further sub-partial regions can then additionally be illuminated in order to increase the resolution of the 3-D sensor. This can be effected in particular in the direction of a hazard defined to be rising by shortening the distance between a detected object and the movable element, such as door, gate, or else a window and suchlike, which constitutes a hazard, if appropriate, for the object and can be driven by a corresponding drive.

In order to be able to ensure that an object is reliably recognized, the light source is configured in such a way that a distance between the partial regions and/or sub-partial regions is less than the smallest extent of a penetrating test object and/or test object situated in the spatial section to be monitored. The dimensions of such a test object are preferably 70 cm×30 cm×20 cm in a first embodiment. For more critical areas of application, however, these dimensions may perfectly well turn out to be significantly smaller, such that the smallest dimension can be, for example, approximately 10 cm, approximately 5 cm or even less than that. The test object represents the dimensions of a relevant object. For instance of a small child.

By virtue of the embodiment of the light source, in the form of a plurality of illumination sources, each sub-partial region can be directly assigned an illumination source. As a result, by way of example, by means of a corresponding arrangement of the illumination sources with respect to one another, the light source can be embodied in such a way that it can generate, if appropriate by corresponding driving of the individual illumination sources, different illumination patterns for monitoring the spatial section to be monitored. By reducing the illumination of the spatial section to be monitored to partial regions to be illuminated, it is further advantageously also possible to achieve a reduction of the structural size of such a 3-D sensor in comparison with a structural size of a 3-D sensor which would be necessary to illuminate the spatial section to be monitored with whole-area illumination having the same light intensity per illuminated area.

In order, by way of example, to be able to obtain a further increase in the light intensity per illuminated area, it is further advantageously possible to provide focusing means for the light source, particularly preferably for each illumination source. In one possible embodiment, a Fresnel lens can be provided for this purpose. Particularly preferably, a common Fresnel lens is provided for this purpose, which focuses the radiation emitted by the illumination sources into the spatial section.

A Fresnel lens reduces the lens structural size otherwise required for the same optical effect, and thus the overall structural size for the relevant 3-D sensor. A further advantage of the use of a Fresnel lens resides in the resultant possibility of positioning the individual illumination sources closer to one another, that is to say moving them closer together, than would be the case when using a plurality of individual lenses for the illumination sources. This is governed firstly by the dimensions of extension of such lenses and of the Fresnel lens and secondly by the comparatively significantly more favorable diffraction properties and thus better focusing of the individual spots of the Fresnel lens in comparison to a plurality of individual lenses.

Particularly on account of the significantly improved light intensity per unit area, it is possible to stipulate a threshold value for the evaluation of the signals detected by the pixels of the reception matrix, such that the supervisory device only evaluates pixels whose intensity exceeds the threshold value. As a result, it is possible to obtain a very high switching sensitivity for the sensor, which ultimately outputs a switching signal to the door and/or gate controller assigned to it, and/or to some other corresponding superordinate supervisory entity. The switching signal could cause the door to slow down or stop, for example.

It is further preferably possible for the supervisory device to combine the pixels assigned to a partial region or sub-partial region for the evaluation. As a result, an adjustment of signals of individual pixels can be effected. By way of example, the latter can be compared with predetermined patterns or suchlike.

By providing the illumination sources in a manner such that they can be activated and/or deactivated in discrete fashion, firstly it is possible to achieve a corresponding energy saving and therefore also an increase in service life for the relevant elements, and secondly, by activation or deactivation of correspondingly positioned illumination sources, a wide variety of illumination patterns, as have already been described above, can be generated for the spatial region to be monitored.

It is further preferably also possible that specific illumination sources are activated and/or deactivated in a manner dependent on an evaluation of an image on the basis of the activated illumination sources. As a result, it is possible to perform, for example, a mode adaptation of the 3-D sensor in accordance with the above-described edge monitoring, with priority, of the spatial section to be monitored proceeding from a recognized object for the further tracking thereof to a mode of the sensor with a changed illumination pattern, in particular in the inner region of the spatial section to be monitored. It is thus possible to supervise the position of the detected object and, in accordance with the distance between the object and the hazard source, to report a correspondingly factorized hazard message to a superordinate entity. In particular, it is possible to effect the activation only of the illumination sources which correspond to those sub-partial regions which are adjacent to a sub-partial region in which an object was recognized. Likewise, it is possible to effect a deactivation of those illumination sources which correspond to those sub-partial regions which are not adjacent to a sub-partial region in which an object was recognized.

With regard to the distance-defining boundary between partial region and interspace, it should also be explained that this involves a threshold value of the intensity of the illumination. The interspace is that space whose illumination lies below a specific illumination intensity. The partial regions as such can be discrete rays or beams which appear on an area as spots, that is to say as light points.

The manner of operation of the 3-D sensor can be based e.g. on a TOF principle (time-of-flight principle). The use of the TOF principle (time-of-flight), makes it possible to determine the distance of an object in the monitoring field as a third dimension. As a result, it is possible not only to monitor a precisely defined area, but, by means of knowledge of the ambient conditions of the sensor, to set the latter to a precisely defined monitoring volume. In this case, the sensor preferably consists of a compact unit including an emitter and a receiver at the same time. In the first step, the scene to be monitored is illuminated by means of LEDs, for example. The emitted light is reflected and passes back into the sensor, where it is detected by means of the receiving unit. The receiving part consists of a TOF chip with a plurality of pixels. Each pixel can receive a measurement ray reflected from an object. By way of example, modulated IR light is used. For distance determination, it is possible to evaluate a phase shift between the received signal and the emitted signal. The corresponding evaluation results in a distance value for each pixel, whereby a three-dimensional/volume-related detection image is obtained. The optical system is designed such that the illumination remains concentrated into individual discrete rays, which leads to corresponding spots having a high light intensity.

The use of a 3-D sensor for monitoring allows more flexibility in the application-specific use. The sensor yields the distance values with respect to the object e.g. in a location-dependent manner (in the x-y plane or the plane perpendicular to the sensor axis).

In one preferred embodiment, the distance between the partial regions and/or the sub-partial regions can correspond approximately to a section covered by two edges of an illuminated partial region and/or sub-partial region. In the case of light rays having a round contour, this can be their diameter, for example.

As one possible embodiment of an illumination source, for example an LED, in particular an infrared LED, can be used, but also other light sources, preferably with an approximately point-type radiation source.

BRIEF DESCRIPTION OF THE DRAWINGS

Referring to the accompanying figures, a plurality of possible embodiments of a 3-D sensor according to the invention are explained below purely by way of example and schematically in greater detail. In the figures.

DETAILED DESCRIPTION OF THE INVENTION

Figure 1:
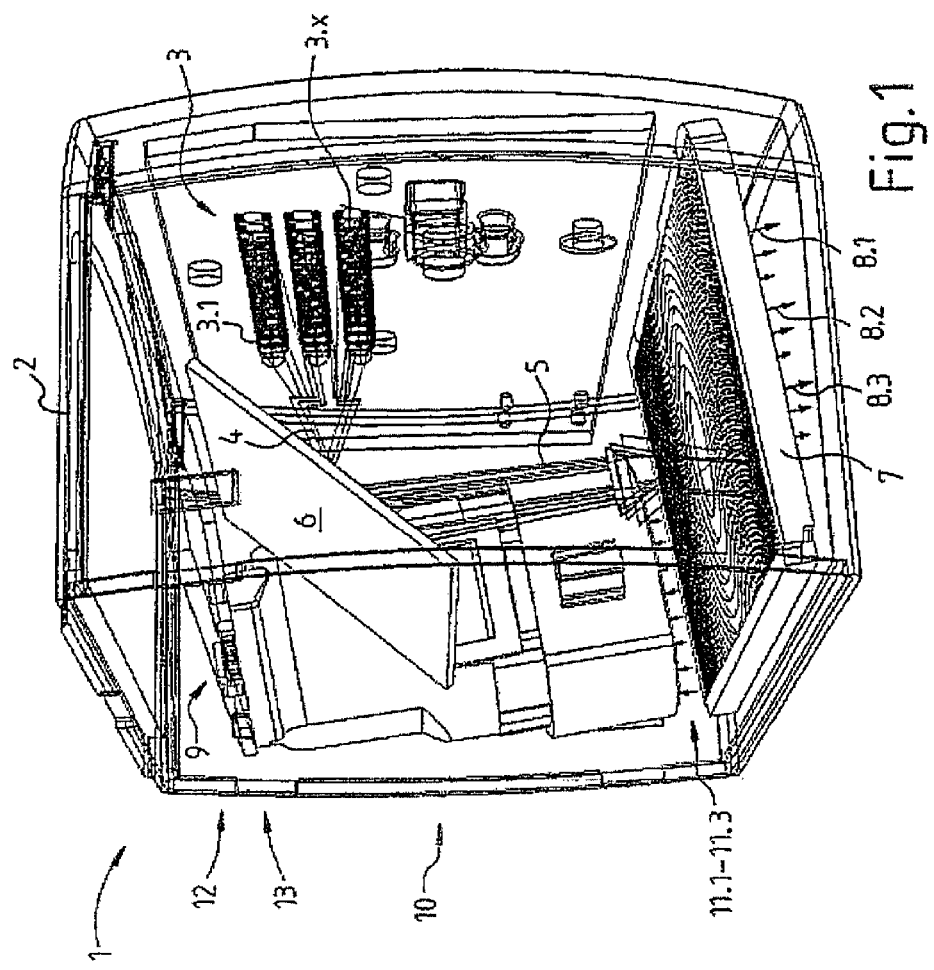
FIGS. 1 to 3 show three perspective views of a sensor according to the invention with and without a housing.

Accordingly, FIG. 1 shows a 3-D sensor 1 comprising a housing 2. A plurality of illumination sources 3.1 to 3.x arranged in rows and columns by way of example form a light source 3 for illuminating a spatial section to be monitored. Arrows 4, 5 symbolically represent the beams which emerge from the individual illumination sources or rows of illumination sources and are deflected at a beam directing means in the form of a deflection mirror 6, the beams, in order to symbolize discrete individual beams, being illustrated by way of example with a plurality of superimposed arrows. This number of beams formed discretely in each case are further concentrated by means of a further beam directing means, which is embodied here in the form of a Fresnel lens 7. Three rows 8.1, 8.2 and 8.3 of small concentrated, discretely formed light rays are illustrated once again symbolically at the beam exit side of the Fresnel lens.

As an alternative and/or in addition to the Fresnel structure illustrated in a manner directed inward in FIG. 1 the beam focusing or beam directing means 7 can also have a further Fresnel structure on the respective opposite surface directed from the sensor toward the outside. By way of example, a further focusing and/or concentration of the individual light rays can be achieved as a result.

The discrete beams emerging from the 3-D sensor in this way are reflected back to the 3-D sensor at the areas irradiated by them and enter as beams 11.1 to 11.3 into a receiving optical system 10 assigned to a reception matrix 9. A complete image of the areas which reflect the light emitted by the light source is imaged in the reception matrix. By way of example the 3-D sensor is fixed to a top side of a door and the area to be imaged is a rectangular area on the ground/floor in front of the door.

An evaluation device 12 determines the distance between the reception matrix and, preferably for each individual pixel of the matrix, the distance between the matrix and a surface that reflects the respective light ray assigned in bijective fashion.

In the case where an object penetrates into this spatial section to be monitored, the distances—determined by the evaluation device—between pixels of the reception matrix and a surface, in this case of the penetrating object or object situated in the spatial region to be monitored, that reflects the radiation emitted by the light source.

By means of the supervisory device 13 in the event of a change in distance values, it is possible to check whether an object penetrates into the spatial section to be monitored and/or is situated therein.

Figure 4:
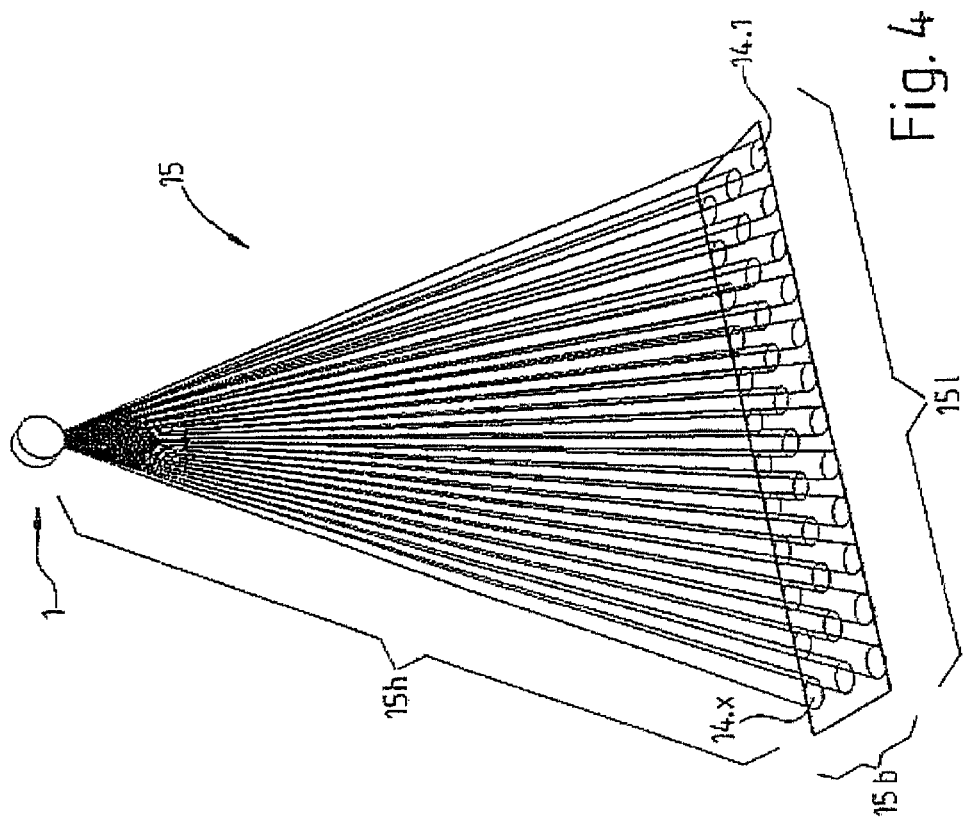
FIG. 4 shows a spatial section defined by a beam path.
Figure 5:
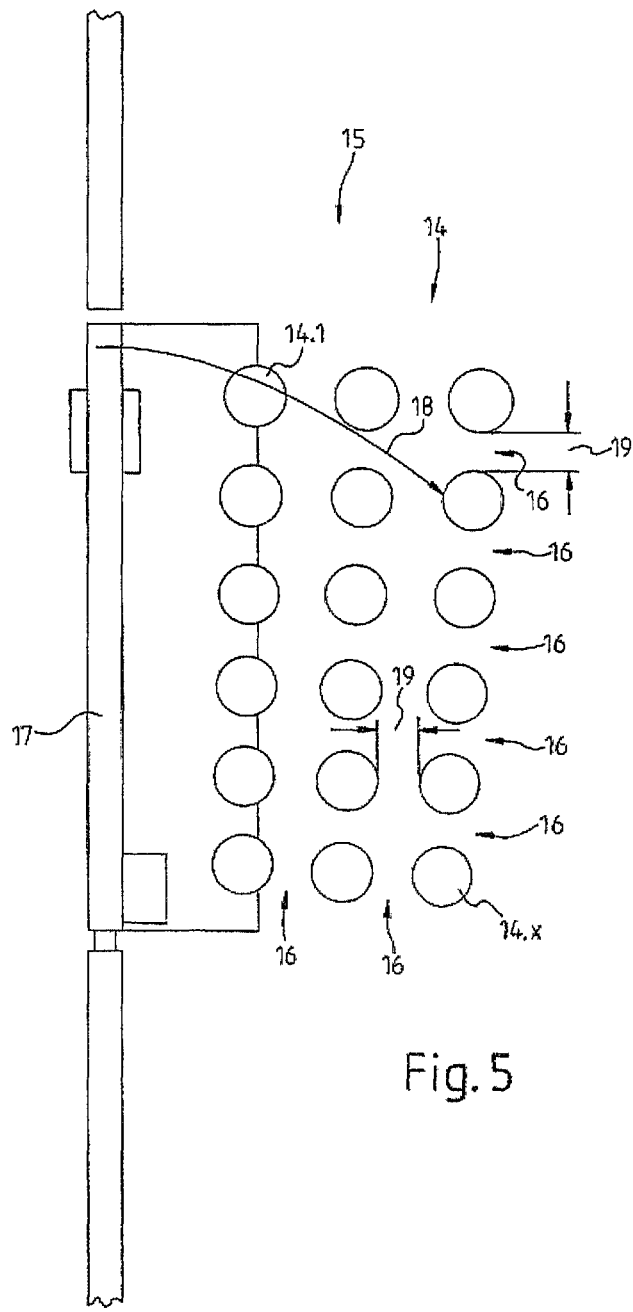
FIG. 5 shows the division of a reflection area delimiting the spatial section into sub-partial regions of an illuminated partial region and non-illuminated interspace.

As a result of the discrete formation of the individual illumination rays in accordance with the ray rows 8.1 to 8.3, only a partial region 14 of the spatial section 15 is illuminated (cf. FIGS. 4 and 5). In this case, the spatial section 15 is defined by a distance 15h between the 3-D sensor 1 and an area spanned by a width 15b and a length 15l.

The partial region 14 illuminated by the light source has a non-illuminated interspace 16. In accordance with the illustration in FIG. 5, the partial region is divided into a plurality of sub-partial regions 14.1 to 14.x, which in this case, by way of example, are each discretely delimited.

FIG. 5 illustrates a plan view of the basic area of a spatial section 15 to be monitored by way of example, the spatial section being situated in the pivoting region of a closing element 17, e.g. in the form of a door, which is driven in movable fashion for example by a drive. The pivotability of the closing element 17 is symbolized schematically by the arrow 18. In order to ensure that no object is situated in this hazard region during a movement of the closing element, the 3-D sensor 1 monitors the relevant spatial section 15.

In order to ensure that objects having a specific minimum size are reliably recognized, a distance 19 between the partial regions and/or sub-partial regions is defined which is less than the smallest extent of a relevant test body. All objects which are of the same size as or larger than the distance cause, in the image detected by the reception matrix, at least one distance change between a pixel and the area that reflects the radiation emitted by the light source.

Figure 2:
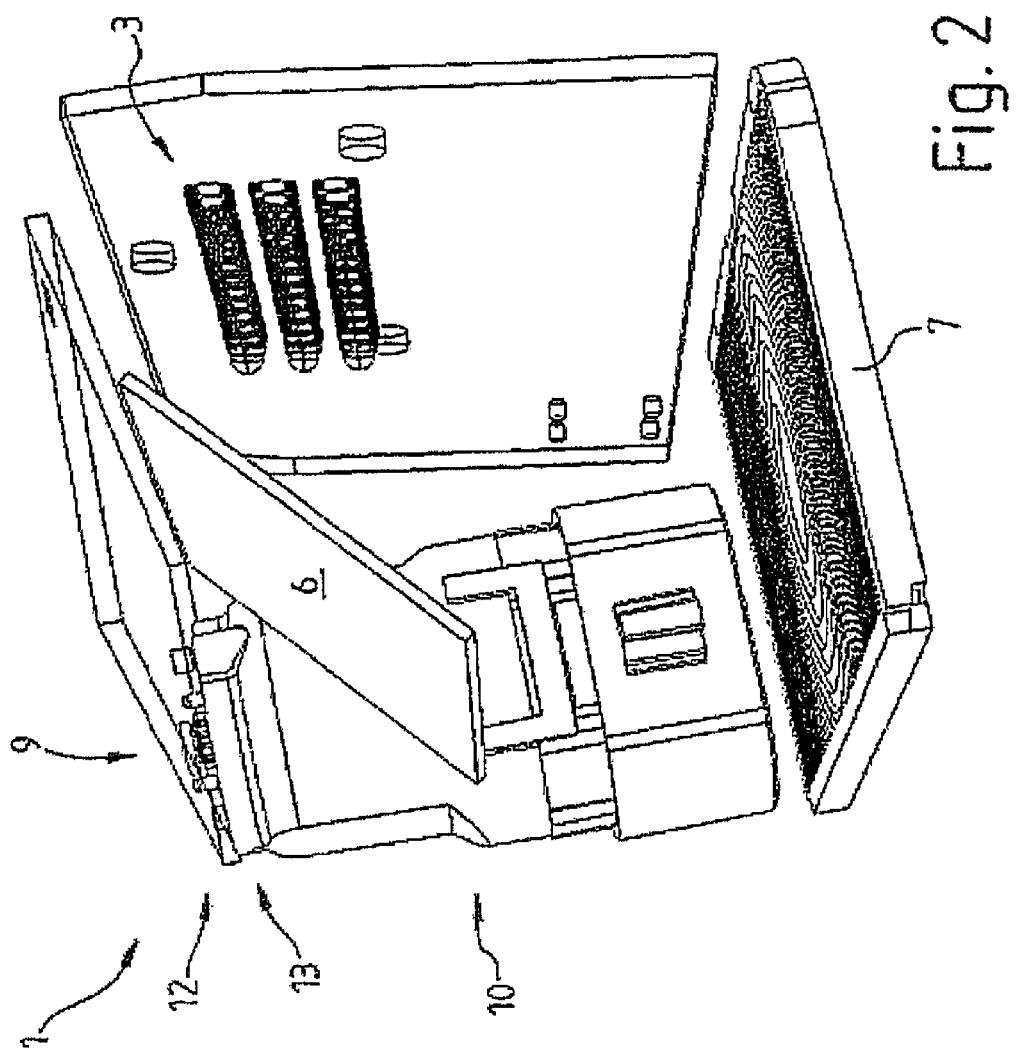

FIG. 2 shows the 3-D sensor in approximately the same perspective as FIG. 1, but without a housing and without beam paths, in order to illustrate the individual elements in a manner that can be discerned better.

Figure 3:
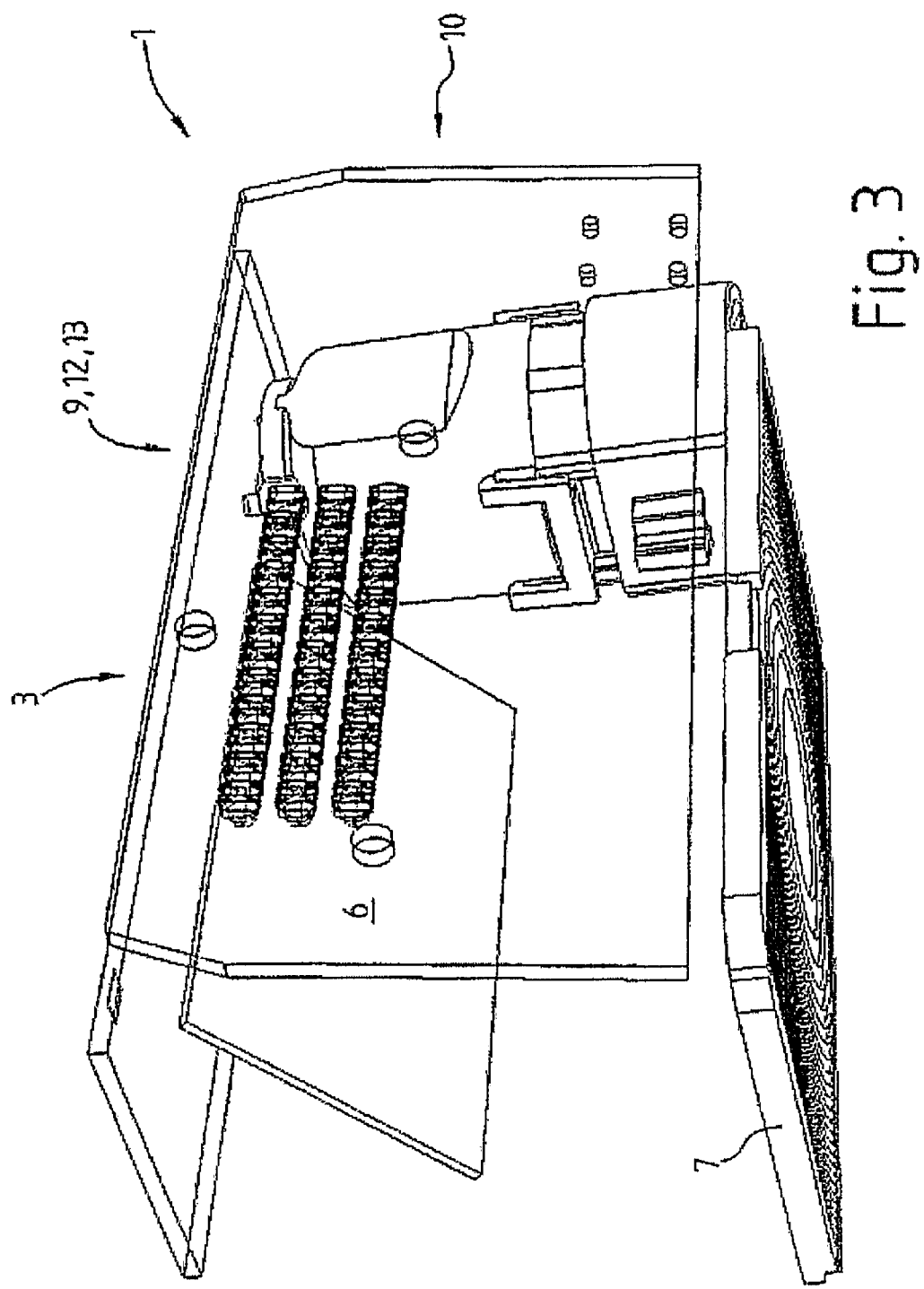

FIG. 3 once again shows the 3-D sensor, likewise without a housing and without beam paths, but from the front and obliquely at the bottom.

LIST OF REFERENCE SYMBOLS 1 3-D sensor
2 Housing
3 Light source
4 Arrow (light beams)
5 Arrow (light beams)
6 Deflection mirror
7 Fresnel lens
8 Arrow (light rays emitted)
9 Reception matrix
10 Receiving optical system
11 Arrow (reflected light rays)
12 Evaluation device
13 Supervisory device
14 Partial region
14.1 ... 14.x Sub-partial region
15 Spatial section
16 Interspace
17 Closing element
18 Arrow
19 Distance

The invention claimed is:

1. A 3-D sensor for controlling a control process comprising a light source having at least one illumination source, a reception matrix, for receiving a complete image of light reflected from areas from a spatial section, an evaluation device for determining the distance between the areas and the reception matrix using time of flight, and a supervisory device for recognizing an object, wherein the light source illuminates a partial region of the spatial section which has at least one interspace, wherein the partial region has a plurality of sub-partial regions separated by the at least one interspace, wherein the light source comprises a plurality of illumination sources and each of the plurality of sub-partial regions is assigned an illumination source from the plurality of illumination sources, and wherein the plurality of illumination sources are focused into the spatial section by a common Fresnel lens.

2. The 3-D sensor as claimed in claim 1, wherein the light source illuminates the sub-partial regions simultaneously.

3. The 3-D sensor as claimed in claim 1, wherein the sub-partial regions are arranged in at least one of a row and a column.

4. The 3-D sensor as claimed in claim 1, wherein the light source is configured in such a way that a distance between one of adjacent partial regions and adjacent sub-partial regions is less than the smallest extent of a test object of a predetermined size.

5. The 3-D sensor as claimed in claim 1, wherein the supervisory device evaluates only pixels whose intensity exceeds a threshold value.

6. The 3-D sensor as claimed in claim 5, wherein the supervisory device combines the pixels assigned to one of adjacent partial regions and adjacent sub-partial regions for evaluation.

7. A 3-D sensor for controlling a control process comprising a light source having at least one illumination source, a reception matrix, for receiving a complete image of light reflected from areas from a spatial section, an evaluation device for determining the distance between the areas and the reception matrix using time of flight, and a supervisory device for recognizing an object, wherein the light source illuminates a partial region of the spatial section which has at least one interspace, wherein the partial region has a plurality of sub-partial regions separated by the at least one interspace, wherein the light source comprises a plurality of illumination sources and each of the plurality of sub-partial regions is assigned an illumination source from the plurality of illumination sources, and wherein the illumination sources are activated and deactivated individually.

8. The 3-D sensor as claimed in claim 7, wherein individual illumination sources are activated and deactivated dependent on an evaluation of an image.

9. The 3-D sensor as claimed in claim 7, wherein the sub-partial regions are arranged in at least one of a row and a column.

10. The 3-D sensor as claimed in claim 7, wherein the light source is configured in such a way that a distance between one of adjacent partial regions and adjacent sub-partial regions is less than the smallest extend of a test object of a predetermined size.

11. The 3-D sensor as claimed in claim 7, wherein the supervisory device evaluates only pixels whose intensity exceeds a threshold value.

12. The 3-D sensor as claimed in claim 11, wherein the supervisory device combines the pixels assigned to one of adjacent partial regions and adjacent sub-partial regions for evaluation.

* * * * *